US010067497B2

(12) United States Patent
Gu et al.

(10) Patent No.: US 10,067,497 B2
(45) Date of Patent: Sep. 4, 2018

(54) SYSTEM AND METHOD FOR IMPLEMENTING COMPENSATION OF GLOBAL AND LOCAL OFFSETS IN COMPUTER CONTROLLED SYSTEMS

(71) Applicant: GM GLOBAL TECHNOLOGY OPERATIONS LLC, Detroit, MI (US)

(72) Inventors: Jie Gu, Clarkston, MI (US); John S. Agapiou, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 282 days.

(21) Appl. No.: 15/093,032

(22) Filed: Apr. 7, 2016

(65) Prior Publication Data

US 2016/0327931 A1    Nov. 10, 2016

Related U.S. Application Data

(60) Provisional application No. 62/157,694, filed on May 6, 2015.

(51) Int. Cl.
*G05B 19/402* (2006.01)
*G05B 19/408* (2006.01)

(52) U.S. Cl.
CPC ....... *G05B 19/402* (2013.01); *G05B 19/4083* (2013.01); *G05B 2219/36054* (2013.01)

(58) Field of Classification Search
CPC .............. G05B 19/402; G05B 19/4083; G05B 2219/36054; G05B 2219/36224

USPC .................................................. 700/176, 193
See application file for complete search history.

(56) References Cited

U.S. PATENT DOCUMENTS

| | | | | |
|---|---|---|---|---|
| 5,339,249 A | * | 8/1994 | Schaeffer | G05B 19/401 700/176 |
| 8,676,373 B2 | | 3/2014 | Gu et al. | |
| 8,712,577 B2 | | 4/2014 | Gu et al. | |
| 2003/0158622 A1 | * | 8/2003 | Corey | G05B 19/40937 700/193 |
| 2009/0112357 A1 | * | 4/2009 | Hammond | B23P 6/002 700/194 |
| 2011/0232120 A1 | * | 9/2011 | Tullmann | G05B 19/404 33/701 |
| 2012/0109361 A1 | * | 5/2012 | Chang | G05B 19/408 700/186 |
| 2012/0215341 A1 | * | 8/2012 | Gu | G05B 19/4083 700/173 |
| 2015/0055852 A1 | * | 2/2015 | Chang | G05B 19/401 382/141 |

* cited by examiner

*Primary Examiner* — Chun Cao
(74) *Attorney, Agent, or Firm* — Quinn IP Law

(57) ABSTRACT

A system for offsetting a CNC machining process includes transferring compensation variables through registers in fixed G-code programming of the CNC machine and offsetting the CNC machine without altering fixed G-code programming. Global compensation variables are applied to all feature programs of the CNC machining process, and local compensation variables are applied to only individual features or groups of features. The machine shifts position in response to the compensation variables.

11 Claims, 9 Drawing Sheets

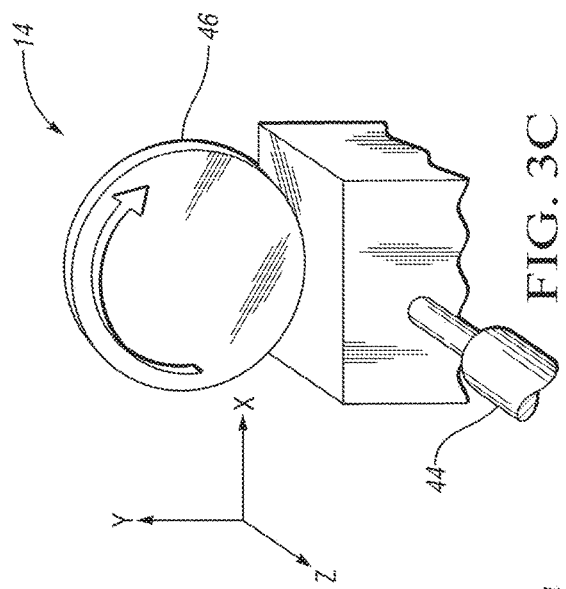
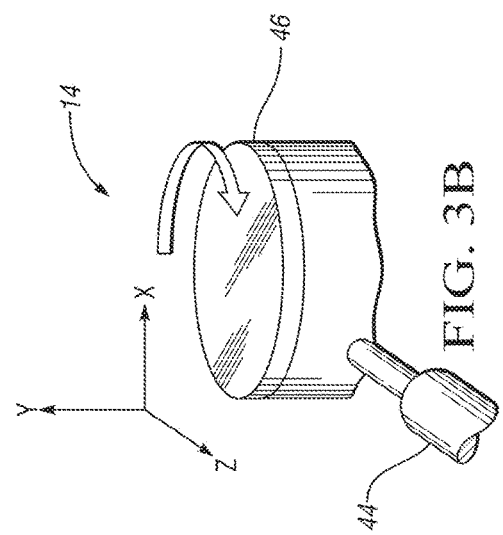
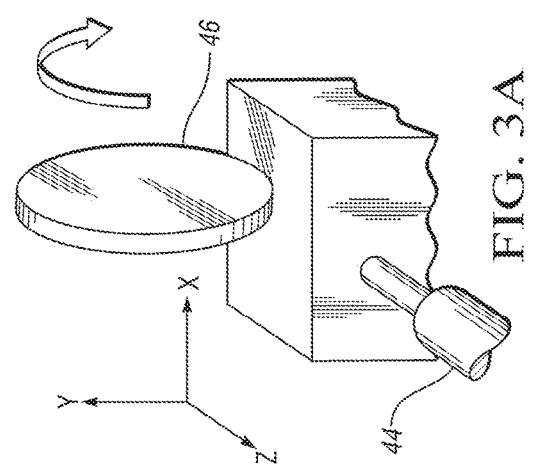

SYSTEM AND METHOD FOR IMPLEMENTING COMPENSATION OF GLOBAL AND LOCAL OFFSETS IN COMPUTER CONTROLLED SYSTEMS

CROSS-REFERENCE TO RELATED APPLICATIONS

This application claims the benefit of U.S. Provisional Application No. 62/157,694, filed May 6, 2015, which is hereby incorporated by reference in its entirety.

TECHNICAL FIELD

The present disclosure relates generally to a system and method for implementing global and local offsets for 4-axis, 5-axis, or other multi-axis CNC machines, or for other computer controlled systems.

BACKGROUND

Computer numerical controlled (CNC) machining systems, and other computer controlled systems, such as robotics, may be used in industrial settings to accurately machine parts according to previously defined plans. Often these plans are developed in a computer aided design package, and may be represented in the form of engineering drawings. A CNC machine may operate according to an assembled sequence of commands (e.g., G-code) that instruct the system to machine a part by moving a controllable cutting tool. During the operation, the system may monitor the real-time position of the part and tool, and may control its position relative to the part via precise servomotor control. The part may be held or clamped within a fixture, which is, in turn, positioned on a machine table.

SUMMARY

A system for offsetting a CNC machining process includes transferring compensation variables through registers in the CNC machine and offsetting the CNC machine without altering fixed G-code programming.

The compensation variables include global variables, which are applied to all features of the part, and local variables, which are applied only to specific features or groups of features. A coordinate measurement machine (CMM) and compensation processor cooperate to generate the compensation variables from error data.

The above features and advantages and other features and advantages of the present disclosure are readily apparent from the following detailed description of the best modes and other embodiments for carrying out the described methods, structures, and processes, when taken in connection with the accompanying drawings.

BRIEF DESCRIPTION OF THE DRAWINGS

FIG. 3A is a schematic perspective view of a 4-axis CNC mill with an A-table.

FIG. 3B is a schematic perspective view of a 4-axis CNC mill with a B-table.

FIG. 3C is a schematic perspective view of a 4-axis CNC mill with a C-table.

DETAILED DESCRIPTION

Figure 1:
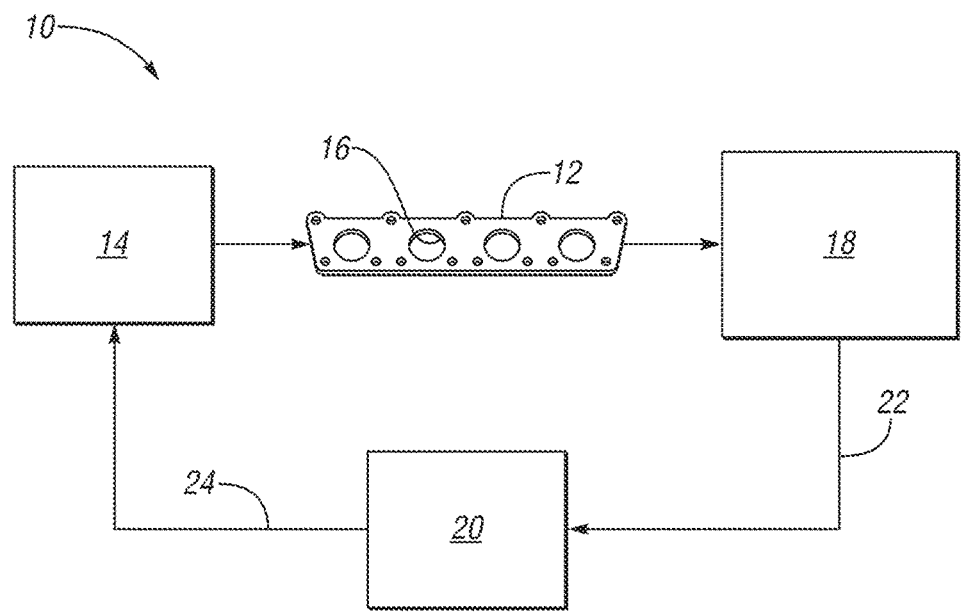
FIG. 1 is a schematic diagram of a system for compensating the dimensional accuracy of a machined part.

Referring to the drawings, wherein like reference numerals are used to identify like or identical components in the various views, FIG. 1 illustrates an exemplary system 10 for compensating the dimensional accuracy of a machined part 12. As shown, the system 10 may include a computer numerical controlled (CNC) machining system 14 that may create one or more features on the part (e.g., hole 16) through one or more machining processes. In an embodiment, the CNC machining system 14 may include a CNC mill, such as, for example, a 4-axis or 5-axis mill (or other multi-axis computer controlled systems, including robots), and may perform processes such as cutting, face milling, boring, honing, and/or drilling.

The part 12 is representative of a single set of design characteristics, often represented by a single part number. Some or all of the design characteristics are implemented by the CNC machining system 14, or a combination of multiple systems, on a plurality of workpieces to create the part 12. A workpiece is an individual instance of the material being transformed by the CNC machining system 14 and being turned into the part 12, such that several workpieces progress successively through the CNC machining system 14 tasked with creating the part 12.

In production, a plurality of CNC machining systems 14 may be used to (substantially simultaneously) process multiple workpieces, such that there are a plurality of parallel lines producing the part 12. Furthermore, each CNC machining system 14 may be capable of producing a plurality of different parts 12 having different sets of design characteristics and different features. Furthermore, each CNC machining system 14 may also be configured to produce multiple variations of the part 12.

Once the one or more features are machined into specific workpieces of the part 12, a coordinate measuring machine (CMM) 18 may measure one or more dimensions of the resulting workpieces. Each measured dimension may be taken with respect to an established datum or control surface that may be specified in a corresponding engineering drawing of the part 12. The engineering drawing may specify a nominal dimension for each measurement, and may further provide acceptable tolerances.

The system 10 may further include a compensation processor 20 that may receive part measurement data 22 from the CMM 18, and compute one or more CNC global offsets, and one or more local offsets 24. The compensation processor 20 may include, for example and without limitation, a COMP (Capability Optimization for Machining Process) software package that may aid in computing the one or more CNC offsets 24. Once computed, the CNC offsets 24 may be loaded into the CNC machining system 14 to enhance the dimensional accuracy of the machining process.

Figure 2:
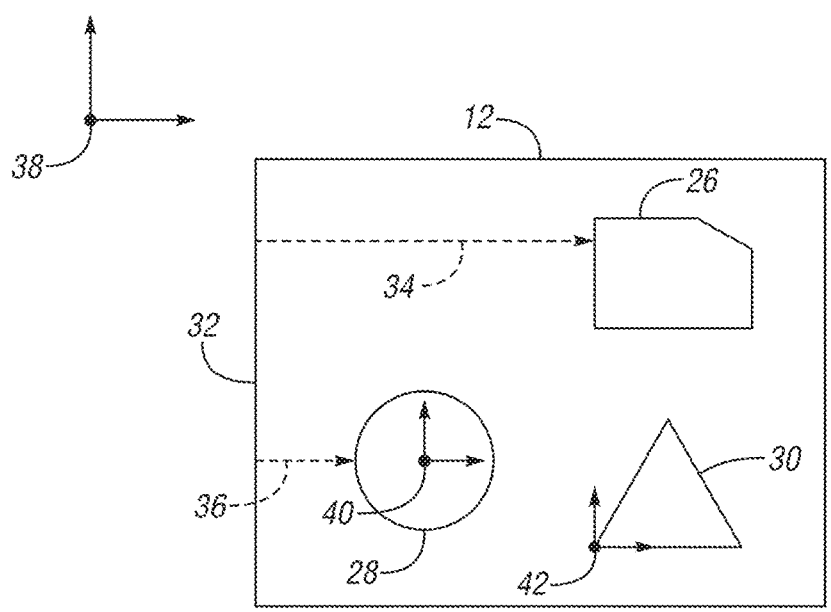
FIG. 2 is a schematic top view of a part having a plurality of features.

As generally illustrated in FIG. 2, the part 12 may include a plurality of features 26, 28, 30. Each feature may be machined by a CNC machining system 14 according to an engineering drawing. Exemplary features may include, without limitation, holes, bores, channels, and/or machined faces. Each machined feature may be positioned with respect to one or more datum or control surfaces. For example, the distance between feature 26 and an edge 32 may define a first dimension 34. Similarly, the distance between feature 28 and the edge 32 may define a second dimension 36.

When a dimension of one or more machined features (e.g., dimensions 34, 36) deviates from the nominal dimensions provided in the drawing, offsets provided by the compensation processor 20 may modify the machining process and attempt to reduce the deviation. In an embodiment, two types of offsets may be available to reduce deviations: global offsets and local offsets (note that both may be concurrently available and implemented).

A global offset may adjust the origin and/or orientation of a global or machine coordinate system 38. This type of offset may affect the dimensions of all features 26, 28, 30 in the part 12. In this regard, the global offset may be similar to a rigid body shift or rotation of the part 12.

Conversely, a local offset may selectively adjust a single feature or group of features by modifying the nominal dimensions/positioning of the CNC machine 14 for only that feature or group of features. As shown in FIG. 2, some features 26, 28, 30 may have nominal positions defined relative to their local centers or coordinate systems 40, 42, which may in-turn be positioned relative to the machine coordinate system 38. Therefore, the local offset may adjust the nominal position of features' local centers 40, 42 within the machine coordinate system 38, without affecting other features.

Even though the global offset is a rigid body motion, it can adjust the workpiece coordinate system to an optimal place so that the feature deviations are minimized. One type of deviation that may require correction may result from elastic deformation during the machining process. For example, if the part 12 is not sufficiently rigid to resist clamping forces and/or cutting tool pressure during the machining process, the part 12 may elastically deform during certain machining processes. Once the forces are removed, the part 12 may return to an undeformed state and shift any feature that was machined while the part was deformed.

The global offset calculated by the compensation processor 20 may provide a median correction so that the total part deviations are minimized. An exemplary metric representing the total part deviation may include the standard deviation of the difference between each measured dimension and its respective provided nominal dimension. There may, however, be a residual deviation that remains after the global offset adjustment is applied. The residual deviation may not be acceptable for features with a tight tolerance. A local offset may allow the deviation of that particular feature to be adjusted (i.e., during machining) so that it is accurately positioned once any elastic loading is removed.

Figure 3D:
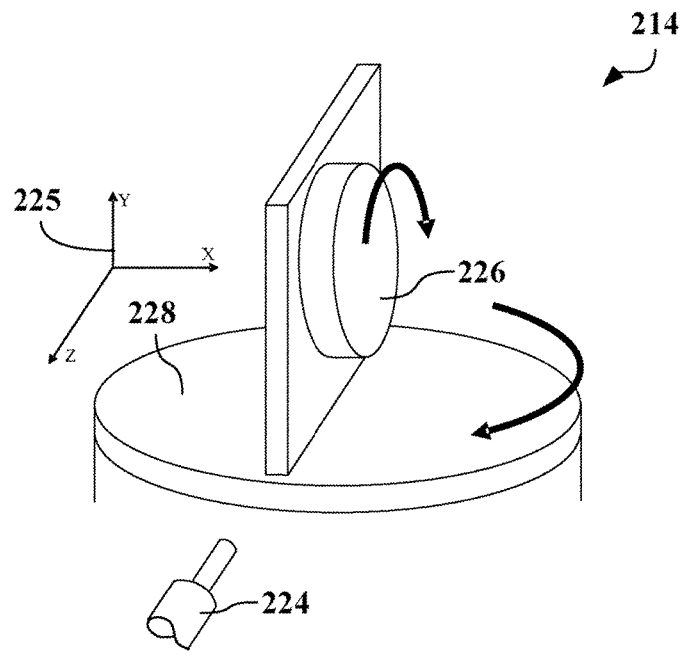
FIG. 3D is a schematic perspective view of a 5-axis CNC mill with an A-table on a B-table.
Figure 3E:
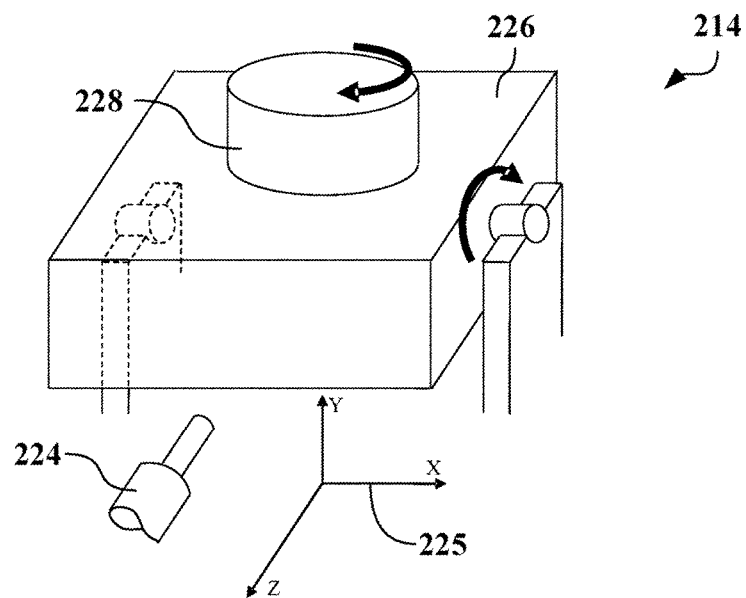
FIG. 3E is a schematic perspective view of a 5-axis CNC mill with a B-table on an A-table.

As illustrated in FIGS. 3A-3E, in some industrial settings, CNC machines may be configured to provide four, five, or more, axes of control. FIGS. 3A-3C illustrate 4-axis CNC machines and FIGS. 3D-3E illustrate 5-axis machines.

FIG. 3A generally illustrates a 4-axis "A" CNC machine, FIG. 3B generally illustrates a 4-axis "B" CNC machine, and FIG. 3C generally illustrates a 4-axis "C" CNC machine. In each illustrated embodiment of the 4-axis CNC machining system 14, the cutting spindle 44 may be capable of three degrees of translation, and the table 46 may be capable of one degree of rotation.

Similarly, FIG. 3D generally illustrates a 5-axis "A-on-B" CNC machine 214, in which an A-table 226 sits on a B-table 228, and FIG. 3E generally illustrates a 5-axis "B-on-A" CNC machine 214, in which a B-table 228 sits on an A-table 226. In each of the CNC machines 214 illustrated in FIGS. 3D-3E, a cutting spindle 224 may be capable of three degrees of translation relative to an illustrative x-y-z coordinate system 225. Rotation of either the A-table 226 or the B-table 228 may be considered rotation about a first axis or a second axis.

Figure 4:
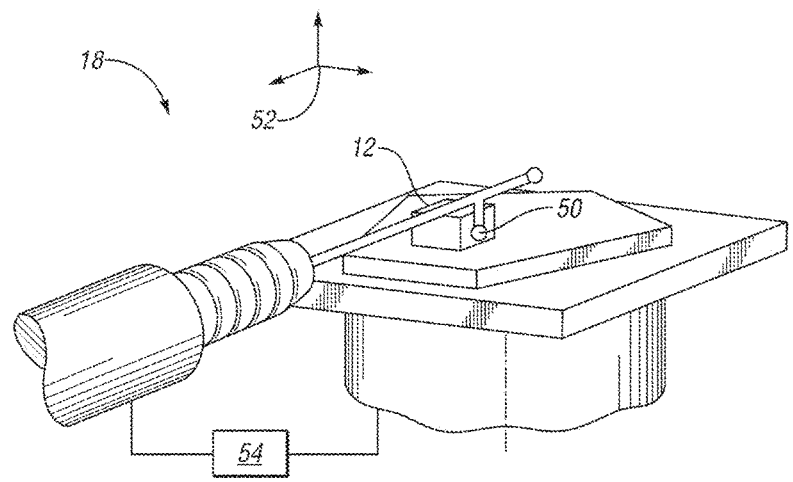
FIG. 4 is a schematic perspective view of a coordinate measuring machine.

FIG. 4 illustrates an embodiment of a CMM 18. As known in the art, a CMM 18 may include a probe 50 that may be numerically located in three-dimensional space 52 by a measurement processor 54. The probe 50 may be moved into physical contact with the part 12, at which time the measurement processor 54 may record a three-dimensional position. By comparing multiple recorded positions, the measurement processor 54 may report one or more distances or dimensions of machined workpieces created to match the part 12. Alternatively, an optical or laser CMM may measure and report dimensions of machined workpieces.

Figure 5:
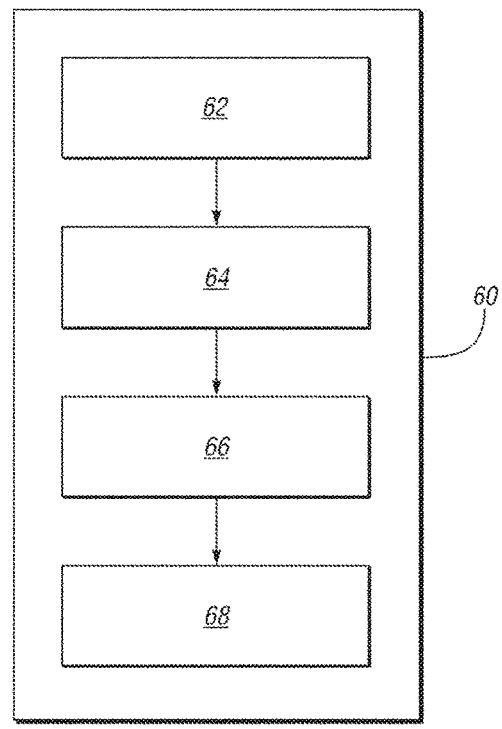
FIG. 5 is a flow diagram of an embodiment of a computerized method for calculating CNC calibration offsets from CMM measurement data.

FIG. 5 illustrates an embodiment of a computerized method 60 for calculating CNC calibration offsets 24 from CMM measurement data 22. The computerized method 60 may be performed in conjunction with or by the compensation processor 20, such as illustrated in FIG. 1. In an embodiment, the computerized method 60 may include providing setup information (Step 62), loading CMM measurement data (Step 64), calculating offsets (Step 66), and outputting offsets and/or performance data (Step 68).

Figure 6:
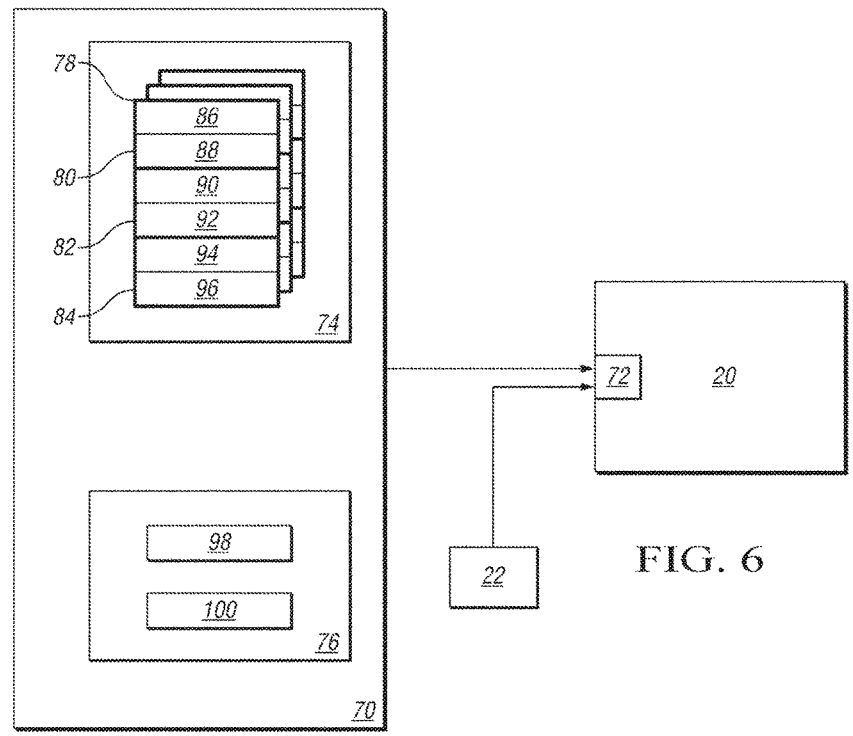
FIG. 6 is a diagram of setup information and CMM data being provided to an interface of a compensation processor.

In Step 62, as illustrated in FIG. 6, the setup information 70 may be provided to the compensation processor 20 via an interface 72. Exemplary types of setup information 70 may include feature descriptive information 74 and part information 76. The interface 72 may include a computer terminal configured to receive entry of the setup information 70 from an operator. In another embodiment, the interface 72 may be an electronic interface where the setup information 70 may be uploaded directly to the compensation processor 20.

In an embodiment, feature descriptive information 74 may include a plurality of feature records 78 that each correspond to a respective feature machined by the CNC machining system 14. Each feature record 78 may include, for example, feature identifying information 80, dimensioning information 82, and/or feature orienting information 84. Exemplary feature identifying information 80 may include a descriptive title for each feature 86 and/or a CMM identifier code 88. Exemplary dimensioning information 82 may include a nominal dimensional value 90 that may be specified for the feature and/or a dimensional tolerance 92. Exemplary orienting information 84 may include the orientation 94 of the CNC table 46 when the respective feature is machined and/or the orientation 96 of the part within the CMM 18 when the dimensional measurement is taken.

Part information 76 may include information that may locate the part 12 within the machine coordinate space. Exemplary part information may include table position information 98 and/or fixture position information 100.

Referring again to FIG. 5, once the setup information is provided to the compensation processor 20 in Step 62, measurement data 22 from the CMM 18 may be loaded into the processor 20 (Step 64). In an embodiment, the measurement data 22 may include raw measurements acquired by the CMM 18 that correspond to nominal dimensions 90 provided for the feature in the feature descriptive setup information 74. The measurement data 22 may be loaded via the interface 72 by manually entering it into a computer terminal. Alternatively, the measurement data 22 may be electronically uploaded to the compensation processor 20.

In an embodiment, the measurement data 22 may represent measurements taken from a statistical sample of multiple parts 12. While data 22 from only one part 12 may allow the compensation processor 20 to properly calculate CNC offsets 24, data 22 obtained from a sample of multiple parts may allow the compensation processor 20 to more completely account for statistical deviations attributable to the machining process.

Figure 7:
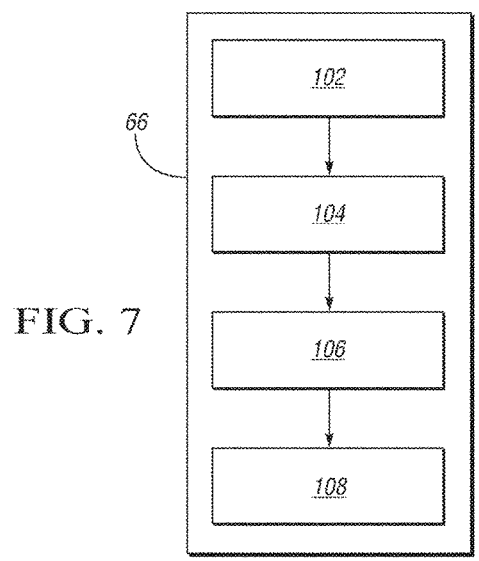
FIG. 7 is a flow diagram of an embodiment of a computerized method for calculating CNC calibration offsets.

Once the setup information and CMM data 22 are loaded into the compensation processor 20 (i.e., Steps 62, 64), the processor may compute one or more CNC offsets (Step 66) that may be used by the CNC machining system 14 to reduce any deviation between the actual feature positions (as measured by the CMM 18) and the nominal dimensional value 90 provided in the feature descriptive information 74. As illustrated in FIG. 7, in an exemplary embodiment, the step of computing one or more CNC offsets (Step 66) may include: translating the CMM measurement data 22 from the CMM coordinate systems to a coordinate system of the CNC machine (Step 102); developing a set of equations that relate feature deviations and available offsets (Step 104); weighting the one or more features of the part 12 according to a degree of significance (Step 106); and optimizing offset variables to minimize total feature deviations from the nominally specified dimensions (Step 108).

Figure 8:
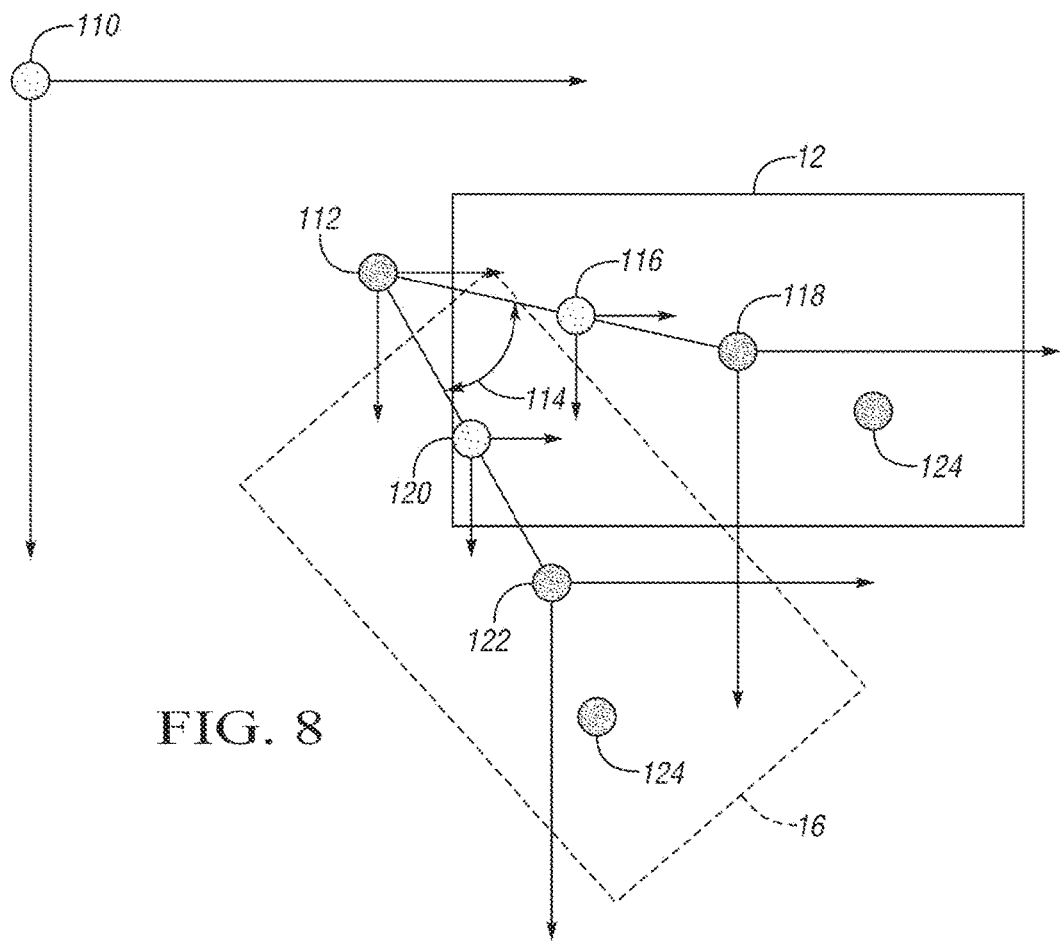
FIG. 8 is a schematic diagram of a plurality of reference coordinate systems within a CNC machining system.
Figure 9:
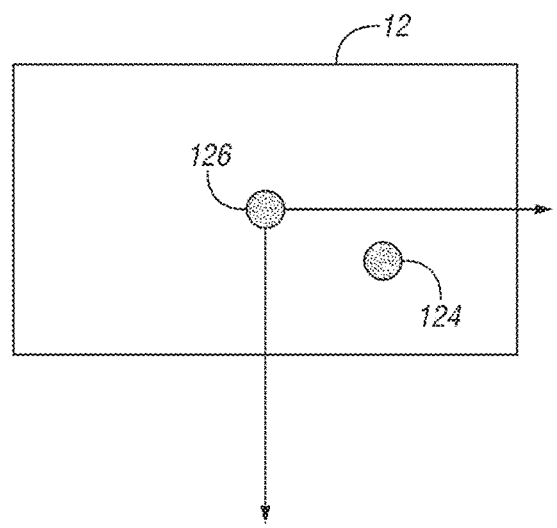
FIG. 9 is a schematic diagram of reference coordinate systems within a coordinate measuring machine.

As illustrated in FIGS. 8-9, the CNC machining system 14 and CMM 18 may each have native, independent coordinate systems (i.e., coordinate systems 110, 126 respectively). As illustrated in FIG. 8, the absolute machine coordinate system "M" 110 of the CNC machining system 14 may be a stationary coordinate system with its origin as the machine home and its positive directions set as the machine way directions. In an embodiment, the CMM 18 may record each measurement as GD&T (geometric dimensioning and tolerancing) values aligned with the arbitrary CMM coordinate system 126.

Referring again to FIG. 8, the origin of a table coordinate system "T" 112 may be aligned on the rotational center of the machine table 46 (as shown in FIGS. 3A-3C). The origin of the T system 112 may be translated a distance from the origin of the M system 110, though it may be orientated in a similar manner as the M system 110. Additionally, the table 46 may be capable of rotating about the table center (e.g., the origin of the T system 112) through a variable angle "B" 114.

In an embodiment, a fixture may be positioned on the table 46 and used to locate and restrain the part 12. The fixture may have a corresponding fixture coordinate system "F" 116 that is located at the center of the fixture. The F system 116 may be translated a distance from the table center, though it may also be oriented in a similar manner as the M system 110 and the T system 112.

The part 12 may be rigidly clamped to the fixture. The part 12 may have a corresponding part coordinate system "P" 118 that is located at the center of the part 12, and aligned with the M system 110. In an embodiment, the origin of the P system 118 may be translated a distance from the origin of the F system 116. As the table 46 rotates about its center through an angle B 114, the fixture and part 12 will similarly rotate about the table center. As illustrated, following a rotation, the origin of the F system 116 (i.e., the fixture center) will assume a new position 120, within the M system 110, and, similarly, the origin of the P system (i.e., the part center) will assume a new position 122. By definition, however, the orientation of the P, F, and T systems 118, 116, 112 may remain aligned with the orientation of the M system 110. The F system 116 may also be referred to as the global coordinate system. Using these exemplary relationships, Equation 1 may be used to define the part center (i.e., origin of the P system 118) within the machine system "M" 110, where the table is oriented on the X-Z plane (i.e., a "B" table). The "W" values in Equation 1 are workpiece coordinates.

$$\vec{M}_{global\_B} = \begin{cases} Wx = (Tx_B) + (Fx_0 + Px_0)\cos B - (Fz_0 + Pz_0)\sin B & \text{Equation 1} \\ Wy = Ty_B + Fy_0 + Py_0 \\ Wz = (Tz_B) + (Fx_0 + Px_0)\sin B + (Fz_0 + Pz_0)\cos B \\ Wb = B \end{cases}$$

As used in Equation 1, the point $(Tx_B, Ty_B, Tz_B)$ represents the nominal center of the B-Table (i.e. the origin of the T system 112), as measured from the machine zero (i.e., the origin of the M system 110). Similarly, the point $(Fx_0, Fy_0, Fz_0)$ represents the distance between the fixture center (i.e., origin of the F system 116) and the table center when table angle B=0; and, the point $(Px_0, Py_0, Pz_0)$ represents the distance between the part center (i.e., the origin of the P system 118) and the fixture center when table angle B=0.

As illustrated in FIGS. 8-9, a feature 124 may be machined into the part 12 by a tool. As illustrated in FIG. 8, as the part 12 moves through the angle B 114, the feature 124 may move within the P, F, and T systems 118, 116, 112, but is inherently fixed on the part 12.

As illustrated in FIG. 9, the CMM coordinate system 126 may be defined on the part 12 and may maintain a constant orientation with respect to the part. Therefore, as the part 12 rotates through the angle B 114, the CMM coordinate system 126 may likewise rotate. In this manner, the position of the feature 124 within the CMM coordinate system 126 may remain constant. In an embodiment, the CMM coordinate system 126 may be positioned on the part center, and may be aligned with the machine coordinate system 110 when B=0. Given this exemplary coordinate definition, Equation 2 may represent the location of the feature 124 within the machine coordinate system 110, where ($X_{cmm}$, $Y_{cmm}$, $Z_{cmm}$) may represent the position of the feature 124 within the CMM coordinate system 126.

$$\vec{M}_{global\_B\_feature} = \begin{cases} Wx = (Tx_B) + \left(\dfrac{Fx_0 + Px_0 +}{X_{cmm}}\right)\cos B - \left(\dfrac{Fz_0 + Pz_0 +}{Z_{cmm}}\right)\sin B \\ Wy = Ty_B + Py_0 + Y_{cmm} \\ Wz = (Tz_B) + \left(\dfrac{Fx_0 + Px_0 +}{X_{cmm}}\right)\sin B + \left(\dfrac{Fz_0 + Pz_0 +}{Z_{cmm}}\right)\cos B \\ Wb = B \end{cases} \quad \text{Equation 2}$$

In an embodiment, the location of the table ($Tx_B$, $Ty_B$, $Tz_B$) and/or the location of the part ($Px_0$, $Py_0$, $Pz_0$) may be offset within the machine coordinate system 110 to correct deviations between the CMM measured location of a feature, and the nominal location of the feature specified by an engineering drawing. Similarly, the angular rotation of the table B may offset to correct deviations. Equation 3 represents the position of a feature within the machine global coordinate system 110 (as identified in Equation 2), including global offsets ($\Delta Tx_B$, $\Delta Tz_B$), ($\Delta Px_0$, $\Delta Py_0$, $\Delta Pz_0$), and $\Delta B$. The global coordinate system 110 may be defined using, for example, the G54 or G55 commands within the CNC code commonly referred to as "G-Code."

$$\vec{M}_{global\_B\_feature} = \begin{cases} Wx = \dfrac{(Tx_B + \Delta Tx_B) + (Fx_0 + Px_0 + X_{cmm} + \Delta Px_0)\cos B -}{(Fz_0 + Pz_0 + Z_{cmm} + \Delta Pz_0)\sin B} \\ Wy = Ty_B + Py_0 + Y_{cmm} + \Delta Py_0 \\ Wz = \dfrac{(Tz_B + \Delta Tz_B) + (Fx_0 + Px_0 + X_{cmm} + \Delta Px_0)\sin B +}{(Fz_0 + Pz_0 + Z_{cmm} + \Delta Pz_0)\cos B} \\ Wb = B + \Delta B \end{cases} \quad \text{Equation 3}$$

Partial derivatives may be used to solve for the linear and/or angular offsets, as demonstrated in Equations 4-5.

$$\Delta \vec{M}_{global\_B\_feature\_linear} = \frac{\partial \vec{M}_{global\_B\_feature}}{\partial T}\Delta T + \frac{\partial \vec{M}_{global\_B\_feature}}{\partial P_0}\Delta P_0 \quad \text{Equation 4}$$

$$\Delta \vec{M}_{global\_B\_feature\_angular} = \frac{\partial \vec{M}_{global\_feature}}{\partial B}\Delta B \quad \text{Equation 5}$$

As can be seen in Equation 6, CNC convention may define the linear adjustment in an opposite direction as the CMM deviation, where the angular adjustment may be in the same direction as the CMM deviation. As shown in Equation 7, the total feature deviation, as expressed in the machine coordinate system "M" 110, may be the sum of the linear and angular deviations.

$$\Delta \vec{M} = \Delta \vec{M}_{global\_feature\_linear} + \Delta \vec{M}_{global\_feature\_angular} \quad \text{Equation 6}$$

Combining Equations 3-6 may result in Equation 7.

$$\Delta \vec{M} = \begin{cases} \Delta X_{global} = \begin{aligned} &-\Delta Tx_B - \Delta Px_0 \cos B + \Delta Pz_0 \sin B - \\ &(Fx_0 + Px_0 + X_{cmm})\sin B \Delta B - \\ &(Fz_0 + Pz_0 + Z_{cmm})\cos B \Delta B \end{aligned} \\ \Delta Y_{global} = -\Delta Py_0 \\ \Delta Z_{global} = \begin{aligned} &-\Delta Tz_B - \Delta Px_0 \sin B - \Delta Pz_0 \cos B + \\ &(Fx_0 + Px_0 + X_{cmm})\cos B \Delta B - \\ &(Fz_0 + Pz_0 + Z_{cmm})\sin B \Delta B \end{aligned} \end{cases} \quad \text{Equation 7}$$

While Equation 7 is helpful in describing feature deviation in a global, machine coordinate system 110, measurement of the feature deviation occurs in the CMM coordinate system 126. Therefore, through a coordinate transformation, Equation 7 may be written in CMM space as shown in Equations 8-10, where Equation 10 is the compensation formula for an embodiment of a 4-axis B machine global offset.

$$\begin{pmatrix} \Delta X_{cmm} \\ \Delta Y_{cmm} \\ \Delta Z_{cmm} \end{pmatrix} = \begin{pmatrix} \vec{i}_{cmm} \cdot \vec{i}_{global} & \vec{i}_{cmm} \cdot \vec{j}_{global} & \vec{i}_{cmm} \cdot \vec{k}_{global} \\ \vec{j}_{cmm} \cdot \vec{i}_{global} & \vec{j}_{cmm} \cdot \vec{j}_{global} & \vec{j}_{cmm} \cdot \vec{k}_{global} \\ \vec{k}_{cmm} \cdot \vec{i}_{global} & \vec{k}_{cmm} \cdot \vec{j}_{global} & \vec{k}_{cmm} \cdot \vec{k}_{global} \end{pmatrix} \begin{pmatrix} \Delta X_{global} \\ \Delta Y_{global} \\ \Delta Z_{global} \end{pmatrix} \quad \text{Equation 8}$$

$$\begin{pmatrix} \Delta X_{cmm} \\ \Delta Y_{cmm} \\ \Delta Z_{cmm} \end{pmatrix} = \begin{pmatrix} \cos B & 0 & \sin B \\ 0 & 1 & 0 \\ -\sin B & 0 & \cos B \end{pmatrix} \begin{pmatrix} \begin{bmatrix} -\Delta Tx_B - \Delta Px_0 \cos B + \Delta Pz_0 \sin B - \\ (Fx_0 + Px_0 + X_{cmm})\sin B \Delta B - \\ (Fz_0 + Pz_0 + Z_{cmm})\cos B \Delta B \end{bmatrix} \\ -\Delta Py_0 \\ \begin{bmatrix} -\Delta Tz_B - \Delta Px_0 \sin B - \Delta Pz_0 \cos B + \\ (Fx_0 + Px_0 + X_{cmm})\cos B \Delta B - \\ (Fz_0 + Pz_0 + Z_{cmm})\sin B \Delta B \end{bmatrix} \end{pmatrix} \quad \text{Equation 9}$$

$$\begin{pmatrix} -\Delta X_{cmm} \\ -\Delta Y_{cmm} \\ -\Delta Z_{cmm} \end{pmatrix} = \begin{pmatrix} \Delta Tx_B \cos B + \Delta Tz_B \sin B + \Delta Px_0 + \\ \Delta B(Fz_0 + Pz_0 + Z_{cmm}) \\ \Delta Py_0 \\ -\Delta Tx_B \sin B + \Delta Tz_B \cos B + \Delta Pz_0 - \\ \Delta B(Fx_0 + Px_0 + X_{cmm}) \end{pmatrix} \quad \text{Equation 10}$$

Equation 10 may be re-written as a linear matrix, as shown in Equation 11.

$$-\begin{pmatrix} \Delta X_{cmm} \\ \Delta Y_{cmm} \\ \Delta Z_{cmm} \end{pmatrix} = \begin{pmatrix} \cos B & \sin B & 1 & 0 & 0 & Fz_0 Pz_0 + Z_{cmm} \\ 0 & 0 & 0 & 1 & 0 & 0 \\ -\sin B & \cos B & 0 & 0 & 1 & -Fx_0 - Px_0 - X_{cmm} \end{pmatrix} \begin{pmatrix} \Delta Tx_B \\ \Delta Tz_B \\ \Delta Px_B \\ \Delta Py_B \\ \Delta Py_B \\ \Delta B \end{pmatrix} \quad \text{Equation 11}$$

As used in Equation 11, each element within the coefficient matrix on the right side of the equation may be determined from the setup information 70 (illustrated in FIG. 6) provided to the compensation processor 20 in Step 62. The left side of Equation 11 represents the difference between a CMM measured dimension for a particular feature and the nominal dimension specified in an engineering drawing. In this exemplary embodiment, the feature deviations are represented in a CMM coordinate system 126 that is aligned with the machine coordinate system 110 when B=0.

The part 12 may include one or more features that do not lend themselves to be easily measured with reference to CMM coordinate system 126. For example, the part 12 may include several features that are dimensioned from various datum. Due to operator or machine convenience and/or accessibility, the part 12 may need to be physically manipulated to obtain the corresponding CMM measurements. In such a case, the compensation processor 20 may need to translate all measurements back into the common CMM coordinate system 126 (which may also be aligned with the global, machine coordinate system 110 when B=0). In an embodiment, the translation from a measurement in an independently oriented coordinate system to a measurement in the CMM reference frame may require a rotational transformation. As known in the art such a rotational transformation may be assembled through a series of 1-3 discrete rotations about one or more axes of the initial coordinate system. Exemplary rotational transforms may include ZYZ or ZYX rotations.

While Equation 11 may describe the global correction/offset for a single feature, in practice the part 12 may include a plurality of features that may each require varying degrees of correction. The compensation processor 20 may use Equation 11 a plurality of times to describe each measured dimension for each respective feature. Referring again to FIG. 7, in Step 104, the processor may assemble all generated equations into a redundant set of simultaneous equations. This set may relate all measured feature deviations back to the six available offsets. This set of equations may likewise account for measurements from more than one part 12 (i.e., from a statistical sample of parts).

Once the set of simultaneous equations is assembled, the compensation processor 20 may subsequently eliminate, or "blank," any equations that may not bear on the final solution. For example, if one of the plurality of features is incomplete or undefined, the equations describing that particular feature may be eliminated from the set.

Once a corresponding set of simultaneous equations is developed that describes all of the intended features, the processor 20 may apply a weighting algorithm to the various equations and/or features (Step 106). The weighting algorithm may increase the influence of more critical features when solving for the global offsets. For example, a feature with a tighter tolerance may be weighted higher than a feature with a more generous tolerance. In an embodiment, the weighting algorithm may operate by dividing both sides of Equation 11 by that particular feature's dimensional tolerance 92. As such, features with a smaller tolerance will be weighted more significantly In Step 108 the compensation processor 20 may determine values for the six offset variables that minimize the feature deviations described in the set of redundant equations. Such a determination may occur via an optimization routine that may choose offset variables which may minimize the expressed deviations. Exemplary optimization routines may include a least square fit solver, a linear programming optimization routine, or other numerical optimization methods.

In an embodiment, prior to performing any optimization the solver may check the system for the existence of singularities. If the solver detects that a singularity is likely to exist, the processor 20 may alert the user and/or modify the equation set to eliminate or "blank" additional problematic equations.

Figure 10:
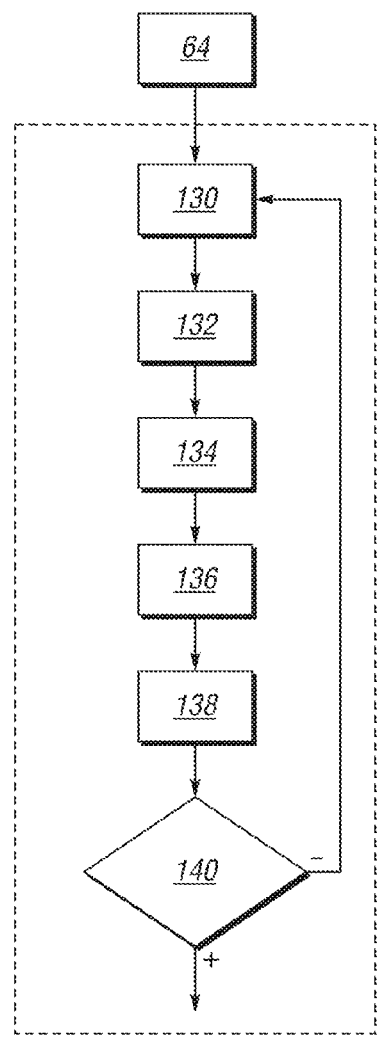
FIG. 10 a flow diagram of an embodiment of a computerized method of computing one or more CNC offsets that includes solving for optimal global offsets and computing one or more local offsets.

In addition to computing global offsets 24, as described above with reference to FIG. 7, the compensation processor 20 may further be configured to compute one or more local feature offsets. As illustrated in FIG. 10, in an embodiment, the step of computing one or more CNC offsets 24 (Step 66 from FIG. 5) may include first solving for optimal global offsets (as generally described above), and subsequently computing one or more local offsets to improve any residual feature deviations. The compensation processor 20 may iterate through one or more series of global-local offset computations until, for example, the incremental change is smaller than a threshold amount.

Equation 12 represents an embodiment of how the local offset may be programmed within the CNC tool path using G-Code. In the first line, the G54 command calls the global offset, and in the second line, the G90G01 command defines the tool path, with $(n_x, n_y, n_z)$ specifying the nominal dimensions of the feature, and $(\Delta x, \Delta y, \Delta z)$ specifying the local offsets for the feature.

$$G54$$
$$G90G01\ X[n_x+\Delta x]Y[n_y+\Delta y]Z[n_z+\Delta z] \qquad \text{Equation 12}$$

After the global offsets are augmented, there may still be a residual deviation that may exist for one or more features. The deviation may initially be expressed in one or more CMM coordinate systems, depending on how the deviations were measured. To be useful, however, the deviation may be translated from the various CMM coordinate systems to a common CMM coordinate system. The common CMM coordinate system may be oriented along the machining coordinate system 110 when the table angular position is zero. In an embodiment, the feature deviation measured in the initial CMM coordinate system may be represented as $(Dx_{r\_CMM}, Dy_{r\_CMM}, Dz_{r\_CMM})$, and the feature deviation in the common CMM coordinate system may be represented as $(Dx_{r\_com}, Dy_{r\_com}, Dz_{r\_com})$. Therefore, Equation 13 may represent the translation of the feature deviation from the initial CMM coordinate system to the common CMM coordinate system, where $M_{CMM=>com}$ represents a transformation matrix.

$$\begin{pmatrix} Dx_{r\_com} \\ Dy_{r\_com} \\ Dz_{r\_com} \end{pmatrix} = M_{CMM=>com} \begin{pmatrix} Dx_{r\_CMM} \\ Dy_{r\_CMM} \\ Dz_{r\_CMM} \end{pmatrix} \qquad \text{Equation 13}$$

As discussed above, the deviations may need to be translated from the common CMM coordinate system to the CNC global coordinate system 110, within which the part is machined. In some instances, this translation may need to account for the directionality of the table rotation, which need not always follow the right-hand rule. Therefore, Equation 14 may be used to express the feature deviations and/or needed adjustments $(Ax_{r\_glo}, Ay_{r\_glo}, Az_{r\_glo})$ in the global coordinate system 110. If there is only one part 12 that has a single feature, the adjustment may be considered the local offset. If there is more than one feature on multiple parts, the local offset may be the weighted average of all adjustments.

$$\begin{pmatrix} Ax_{r\_glo} \\ Ay_{r\_glo} \\ Az_{r\_glo} \end{pmatrix} = - \begin{pmatrix} \cos B & 0 & -\sin B \\ 0 & 1 & 0 \\ \sin B & 0 & \cos B \end{pmatrix} M_{CMM => com} \begin{pmatrix} Dx_{r\_CMM} \\ Dy_{r\_CMM} \\ Dz_{r\_CMM} \end{pmatrix} \quad \text{Equation 14}$$

As may be appreciated, Equations 1-14 are shown for exemplary purposes. While these equations represent global offsets for a 4-Axis CNC system with a B-table, one skilled in the art may similarly develop equations that represent offsets for other table configurations (e.g., 4-axis A-tables and/or C-tables).

With reference to FIG. 10, an embodiment of the process for computing one or more CNC offsets 24 (Step 66) may include: calculating a global offset from CMM data received in Step 64 (Step 130); analytically applying the global offsets to the derived system equations and calculating remaining deviations (Step 132); calculating a local offset for one or more features (Step 134); calculating residual deviations and adding them to the nominal dimensions (Step 136); accumulating the incremental global and local offsets 130, 134 for overall global and local offsets (Step 138); and iterating if the incremental change to the offsets is not below a threshold (Step 140).

The calculation of incremental global offsets (Step 130) may be similar to the process described with respect to FIG. 7, and may include relating the residual deviation data, as provided by the CMM measurements 22 to a coordinate system of the CNC machine (Step 102); developing a set of equations that relate feature deviations and available offsets (Step 104); weighting the one or more features of the part 12 according to a degree of significance (Step 106); and/or optimizing offset variables to minimize total feature deviations from the nominally specified dimensions (Step 108).

Once the incremental global offsets are determined, the compensation processor 20 may determine the deviations that are expected to exist for each feature after the table, part, and/or angular attributes have been augmented by the calculated incremental global offsets (i.e., Step 132). Then, on a feature-by-feature basis, the compensation processor 20 may use these remaining deviations to calculate the incremental local offsets.

Where multiple features and parts share common attributes within a reference frame, the local offset may be calculated as a weighted average of the residual deviations over the multiple features and parts. In an embodiment, the weighted average may be determined by dividing each deviation by the dimension's corresponding tolerance. As such, a feature with a smaller tolerance will have more importance in the weighted average than a feature with a larger tolerance.

Once the incremental global and local offsets are computed, they may be added to any previous offsets in Step 138. At this point, the compensation processor may examine whether the incremental changes to the offsets are below a given threshold amount (Step 140), and re-compute the global offsets (Step 130) if they are not. An exemplary threshold amount for the incremental change may be 0.001.

Referring back to FIG. 5, once the global and/or local offsets are calculated (Step 66), the compensation processor 20 may output them to the CNC machining system 14, and may further output various forms of performance data to the user. Depending on the level of integration between the compensation processor 20 and the CNC machining system 14, the offsets 24 may be either directly provided to the CNC machining system 14, or may be displayed for a technician to enter them manually, such as through a human machine interface (HMI). In either embodiment, the offsets 24 may serve to adjust one or more coordinate systems defined within the CNC code. As described above, the global offsets that may be derived from, for example, an optimization routine, and may serve to adjust the position and/or orientation of the part 12 as a whole. Other local offsets may be derived by the compensation processor 20, and may individually adjust one or more local features of the part 12.

Figure 11:
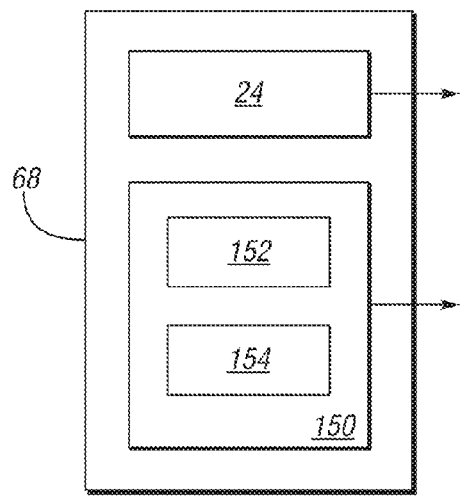
FIG. 11 is a flow diagram of output data being provided by a compensation processor.

As illustrated in FIG. 11, in addition to outputting the various CNC offsets 24, the compensation processor 20 may also compute and provide performance data 150 to the user. The performance data 150 may summarize and/or compare the deviations before and after the corrections, and may be summarized in tabular form 152 and/or graph form 154. In an embodiment, the performance data 150 may analyze the changes in feature deviations as a percent of the provided tolerance for that feature. The performance data 150 may report the changes on a feature-by-feature basis and/or as an average deviation for the part.

For 5-axis CNC machines, such as those shown in FIGS. 3D and 3E, the equations for compensation calculation include five global offsets based upon nine compensation variables. The 5-axis compensation equations are run by the compensation program, based on data provided by CMM measurements of one or more workpieces, and are similar to those for 4-axis CNC machines.

The global offset compensation equation for the 5-axis A-on-B machine, such as that shown on FIG. 3D, is shown below as Equation 15.

$$\begin{cases} Wx = \begin{bmatrix} (Tx_B + \Delta Tx_B) + (Tx_A + Px_0 + \Delta Px_0)\cos B - \\ [(Tz_A + \Delta Tz_A) - (Py_0 + \Delta Py_0)\sin A + \\ (Pz_0 + \Delta Pz_0)\cos A] \sin B \end{bmatrix} \\ Wy = \begin{matrix} (Ty_B + Ty_A + \Delta Ty_A) + (Py_0 + \Delta Py_0)\cos A + \\ (Pz_0 + \Delta Pz_0)\sin A \end{matrix} \\ Wz = \begin{bmatrix} (Tz_B + \Delta Tz_B) + (Tx_A + Px_0 + \Delta Px_0)\sin B + \\ [(Tz_A + \Delta Tz_A) - (Py_0 + \Delta Py_0)\sin A + \\ (Pz_0 + \Delta Pz_0)\cos A] \cos B \end{bmatrix} \\ Wa = \Delta A \\ Wb = \Delta B \end{cases} \quad \text{Equation 15}$$

Where (Wx, Wy, Wz, Wa, Wb) is the global workpiece coordinate definition to be used for compensation of the CNC machine 214. Where ($Tx_A$, $Ty_A$, $Tz_A$) is the nominal center of the A-table 226 from the center of the B-table 228. Where ($Tx_B$, $Ty_B$, $Tz_B$) is the nominal center of the B-table 228 from the center of the CNC machine 214. Where ($Px_0$ $Py_0$ $Pz_0$) is the nominal center of the fixture from the center of the A-table 226. The A and B entries are the respective nominal table rotary positions.

The 5-axis equations include nine different global compensation variables, each of which is identifiable in Equation 15 by its inclusion of a "Δ" character. There are two table offset variables ($\Delta Ty_A$, $\Delta Tz_A$) for offsetting the A-table 226 in the Y and Z directions. There are two table offset variables ($\Delta Tx_B$, $\Delta Tz_B$) for offsetting the B-table 228 in the X and Z directions.

There are three fixture offset variables ($\Delta Px_0$, $\Delta Py_0$, $\Delta Pz_0$) for offsetting a fixture attached to the A-table 226 in the X, Y, and Z directions. Finally, there are two rotation offset variables: a rotation offset variable ΔA is in A direction, and a rotation offset variable ΔB is in B direction.

As described herein, the global (and local) variables will be fed, as parameters, into a compensation program within the CNC machine 214. Parameters are the incorporation of the global and local offset variables within otherwise-fixed G-code programming.

The global offset compensation equation for the 5-axis B-on-A machine, such as that shown on FIG. 3E, is shown below as Equation 16.

$$\begin{cases} Wx = \begin{matrix}(Tx_A + Tx_B + \Delta Tx_B) + (Px_0 + \Delta Px_0)\cos B - \\ (Pz_0 + \Delta Pz_0)\sin B \end{matrix} \\ Wy = \begin{matrix}(Ty_A + \Delta Ty_A) + (Ty_B + Py_0 + \Delta Py_0)\cos A + \\ \left[ \begin{matrix}(Tz_B + \Delta Tz_B) + (Px_0 + \Delta Px_0)\sin B + \\ (Pz_0 + \Delta Pz_0)\cos B \end{matrix}\right]\sin A \end{matrix} \\ Wz = \begin{matrix}(Tz_A + \Delta Tz_A) - (Ty_B + Py_0 + \Delta Py_0)\sin A + \\ \left[ \begin{matrix}(Tz_B + \Delta Tz_B) + (Px_0 + \Delta Px_0)\sin B + \\ (Pz_0 + \Delta Pz_0)\cos B \end{matrix}\right]\cos A \end{matrix} \\ Wa = \Delta A \\ Wb = \Delta B \end{cases} \quad \text{Equation 16}$$

Where (Wx, Wy, Wz, Wa, Wb) is the global workpiece coordinate definition to be used for compensation of the CNC machine 214. Where $(Tx_A, Ty_A, Tz_A)$ is the nominal center of the A-table 226 from the center of the CNC machine 214. Where $(Tx_B, Ty_B, Tz_B)$ is the nominal center of the B-table 228 from the center of the A-table 226. Where $(Px_0, Py_0, Pz_0)$ is the nominal center of the fixture from the center of the B-table 228. A and B are the nominal rotary positions.

There are two table offset variables $(\Delta Ty_A, \Delta Tz_A)$ for offsetting the A-table 226 in the Y and Z directions. There are two table offset variables $(\Delta Tx_B, \Delta Tz_B)$ for offsetting the B-table 228 in the X and Z directions. There are three fixture offset variables $(\Delta Px_0, \Delta Py_0, \Delta Pz_0)$ for offsetting a fixture attached to the A-table 226 in the X, Y, and Z directions. Finally, there are two rotation offset variables: a rotation offset variable ΔA is in A direction and a rotation offset variable ΔB is in B direction.

Note that the nine global compensation variables are the same for both the 5-axis A-on-B and the 5-axis B-on-A CNC machines 214 shown in FIGS. 3D and 3E. Regardless of the specific set-up of the 5-axis CNC machine 214, the nine global compensation variables will combine to offset the location of the workpiece within the fixed G-code program of the CNC machine 214 to more-accurately produce workpieces matching the design of the part. The compensation processor may determine or solve for values of the global compensation variables based on similar solutions to those illustrated relative to the 4-axis equations detailed above.

The global offset variables provide a way to target rigid body motion of the part 12 and the CNC machine 214. The global offset variables compensate the imperfections and alignment errors in the fixture and tables (or single table) in addition to the geometric errors of the machine structure. The global offset variables may correct for distortion of the part 12 due to, for example and without limitation: clamping pressure, cutting forces, tooling side load, temperature variation, residual stress relieving, and assembly error.

Each instance or iteration of offsetting the CNC machine 214 may be considered moving from a first workpiece coordinate definition to a second workpiece coordinate definition. Changing from the first workpiece coordinate definition to the second workpiece coordinate definition physically alters the position of the workpieces in the CNC machine 214.

Note also that the nine global compensation variables are the same for every feature of the part 12 being machined into each workpiece. However, individual features or groups of features may require local offsets to be overlaid onto the global offsets, for those features only. Therefore, the local offsets temporarily shift the position of the CNC machine 214 during implementation programs only for those individual features or groups of features. The features programs for the individual features or groups of features may also be referred to as a subset of all feature programs, whereas the feature programs affected by the global offsets encompass the entire set of feature programs.

The local offsets account for residual errors for which the global offsets are unable to compensate, usually due to the errors occurring only with respect to specific features, as opposed to all features of the part 12. In some cases, the local offset variables are compensating for the primary errors occurring relative to those features, because the local features distortions/errors are greater than the global distortions/errors, such that the local offsets need not be smaller than the global offsets.

Therefore, the compensation determination may also include determination of local offset variables, for specific features or groups of features, which are overlaid onto the global offset variables. The local compensation variables are used in addition to the workpiece coordinate definition generated from the global compensation variables. The local compensation variables often take the form of a minor adjustment to the nominal value of the coordinate system and are used to fine-tune the compensation of a specific feature or a group of features, all of which are machined in the same table position (for 4-axis machines) or combined table position (for 5-axis machines).

The local offset variables apply only to specific features or groups of features that are machined at the same table angles (A and B). For features utilizing local offset variables, Equation 17 illustrates overlaying of the local offsets onto the global offsets.

$$\begin{cases} Wx_{li} = Wx + \Delta Lx_i \\ Wy_{li} = Wy + \Delta Ly_i \\ Wz_{li} = Wz + \Delta Lz_i \end{cases} \quad \text{Equation 17}$$

In Equation 17, $(Wx_{li}, Wy_{li}, Wz_{li})$ is the ith local coordinate definition, for feature or group of features "i," such that a first feature requiring local offset will define the local coordinate definition at $(Wx_{l1}, Wy_{l1}, Wz_{l1})$. The global workpiece coordinate definition (Wx, Wy, Wz) is taken from either Equation 15 or Equation 16, such that the local offset variables are laid over the top of the global offset variables that defined the global workpiece coordinate definition. The local offset variables (ΔLx, ΔLy, ΔLz) are the local offsets in the X, Y, and Z directions.

There is no rotary offset for local feature offsets. The rotary offset is accounted for in the global offset. The local offset may only be applied to features machined in a common table position for a 4-axis machine, or in a common combined table position for a 5-axis machine. In many instances, the local offset variables may be applied to all the features in the specific combined rotary position.

Figure 12:
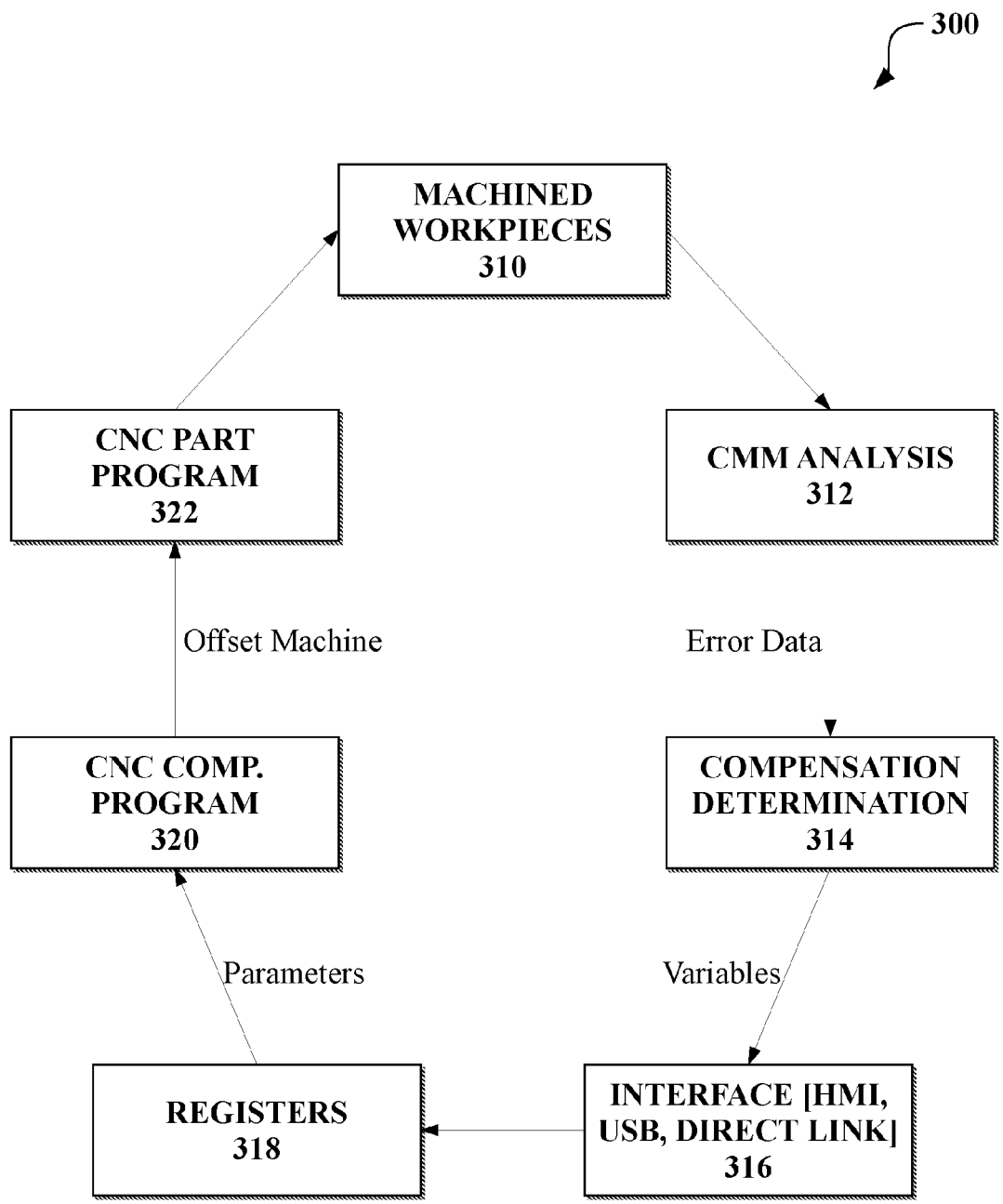
FIG. 12 is a schematic diagram illustrating implementation of compensation calculations into fixed G-code programming of a CNC machine.

Referring also to FIG. 12, there is shown a schematic diagram of a compensation process 300 illustrating implementation of the compensation calculations into the fixed G-code programming of a CNC machine, such as the 4-axis CNC machines 14 shown in FIGS. 3A-3C, the 5-axis CNC machines 214 shown in FIGS. 3D and 3E, or other multi-axis controllable systems, such as robots. A block 310 illustrates machined workpieces. These workpieces have undergone at least one milling operation on the CNC machine, such that they have moved from raw to finished (or partially finished) workpieces. These workpieces provide a set of production examples from the CNC machines 214, and may be used to determine the accuracy of the process relative to the defined characteristics of the part 12 being produced.

A block 312 represents CMM analysis. In this stage of the compensation process 300, one or more of the machined workpieces is subjected to measurement by a CMM device, such as the CMM 18 illustrated in FIG. 4. The CMM analysis may include measurement and recording of dimensions and features, and the relative locations and relationships of features, such that the machined workpieces may be compared to the design of the part and the tolerances associated with individual features. The CMM device, or a computer associated therewith, produces data from the measurements of the machined workpieces, and may generate error data based on deviations from the part 12.

A block 314 represents use of the compensation equations to make a determination of the compensation needed to improve the current or subsequent workpieces created by the CNC machine 214. The compensation determination may occur in a compensation processor, such as a laptop computer, desktop computer, or tablet device, that is capable of receiving the CMM data from the CMM analysis in block 312. As discussed herein, the compensation equations are used to identify the specific global and local variables for offsetting the CNC machine 214.

Figure 13:
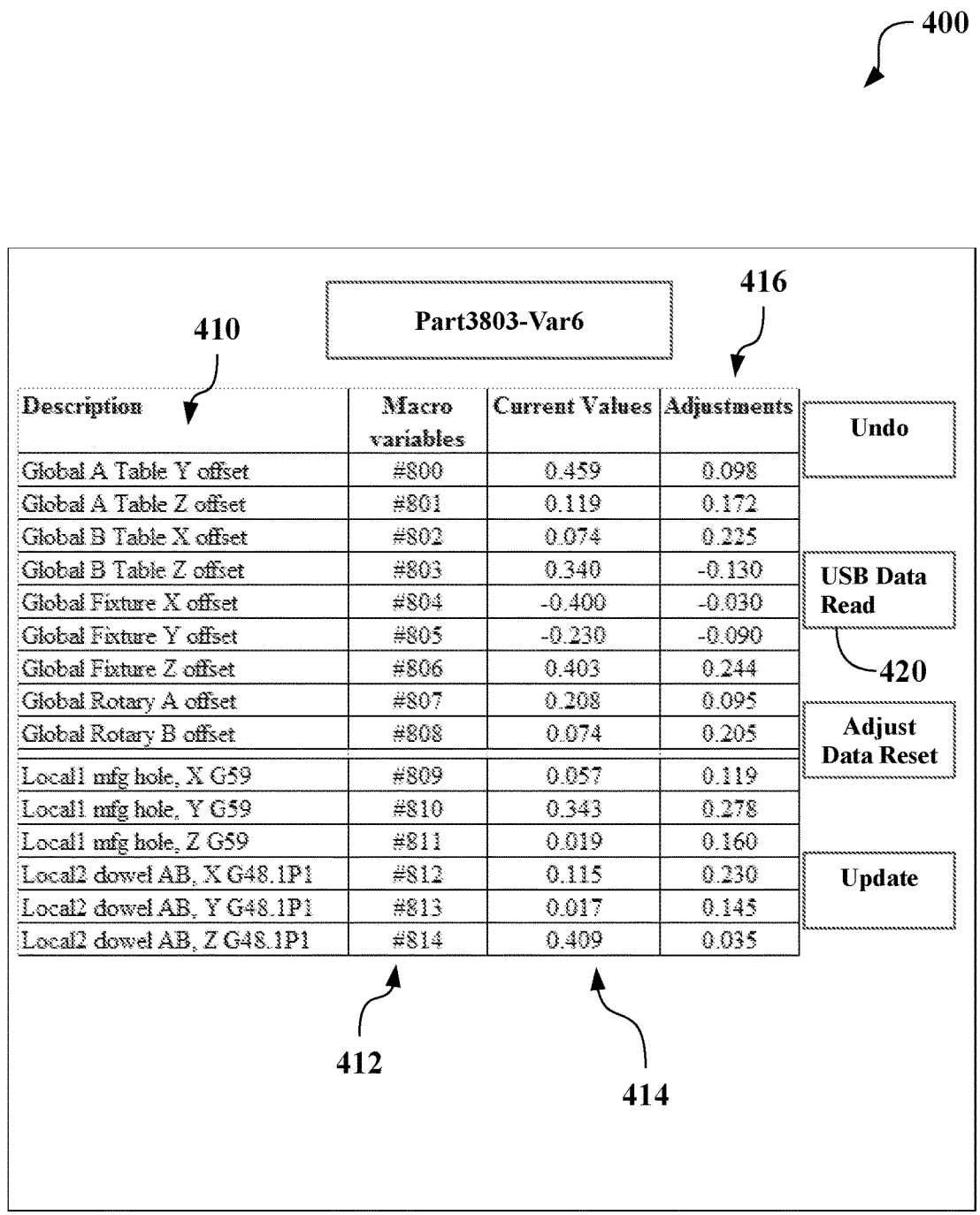
FIG. 13 is a schematic illustration of a human machine interface (HMI) for transferring global and local compensation variables to the CNC compensation program.

A block 316 represents an interface between the computer determining the variables for compensation and the CNC machine 214. Depending on the configuration, the interface may include a human machine interface (HMI), a USB drive, a direct link, combinations thereof, or other communication means (including wireless communication protocols). One example of an HMI usable to transfer global and local variables to the CNC machine 214 is illustrated in FIG. 13.

A block 318 represents registers built into the CNC machine 214, which provide access to the fixed G-code of the CNC machine 214. The registers are data holding places or instructions that allow the variables calculated by the compensation equations to be implemented within a fixed G-code compensation program without altering the G-code compensation program itself. Through the use of built-in registers, the global and local compensation variables can be accessed by the fixed G-code of the CNC machine 214 without reprogramming any of the G-code on the CNC machine 214.

A block 320 represents the CNC compensation program, which is accessed through the registers. An illustrative example of a CNC compensation program for the 5-axis, A-on-B CNC machine 214 is shown below in Table 1. The global and local variables determined by the compensation processor are sent through the registers to be input as parameters of the CNC compensation program within the CNC machine 214. The nine global offset variables are illustrated in Equations 15 and 16, and correspond to nine global parameters within the CNC compensation program. For individual features requiring compensation, there are three local offset variables, which correspond to three local parameters within the CNC compensation program.

Within the CNC compensation program, the global parameters (for the global offsets) are entered first and are consistent for the whole part. Then, the local parameters (for the local offsets) are overlaid onto the global parameters only when needed for specific features or groups of features. Therefore, the global parameters are implemented for all features of the part, and local parameters are only implemented for specific features of the part, if any local variables were determined.

A block 322 represents execution of the CNC part program to machine workpieces mounted to the CNC machine 214. Execution of the part program takes place with the CNC machine 214 offset by the workpiece coordinate definition, as shown by Equations 15 and 16, and offset by the local coordinate definition, if needed, as shown by Equation 17. The CNC machine 214 is operating on a coordinate system that is offset—i.e., the CNC machine 214 physically moves—based upon the global and local offset parameters entered through the registers. Therefore, the performance of the CNC machine 214 is improved without changing the G-code program or recalibrating the CNC machine 214.

The block 322 may also be considered, or broken into, a series of feature programs, each of which creates a specific feature or surface of the part. The block 322 rechecks the compensation program for any required local offset parameters relative to the specific subset of feature programs being implemented at the time. If needed, the local offsets are then overlaid onto the global offsets running constantly for all of the feature programs. The machined workpieces created by the CNC part program may then be quality checked by CMM analysis and used to provide further data for the compensation determination. FIG. 12 illustrates how the use of parameters within fixed G-code improves performance of the CNC machine 214 without altering the programming itself.

The CNC machine 214 may be configured to produce multiple, different, parts or multiple variations of the same part. In such a configuration, the global offset parameters may be consistent throughout the parts or variations. Furthermore, some of the local offset parameters may be consistent, particularly with similar parts or part variations.

Referring now to FIG. 13, there is shown an illustrative human machine interface (HMI) 400. In FIG. 13, the HMI 400 is represented as an interactive screen or display. The HMI 400 is one example of an interface system that may be used to communicate between a compensation processor, which determines the global and local compensation variables, and the CNC machine 214, which effects the compensation by offsetting the workpiece coordinate definition, as shown in Equation 17.

As illustrated in FIG. 13, the HMI 400 includes descriptions 410 of variables 412. The variables 412 correspond to G-code used in a compensation program, as illustrated in Table 1. A column of current values 414 and a column of adjustments 416 are also included. A direct upload button 420 may also be included in the HMI 400.

The HMI 400 also illustrates two options for the interface block 316 of FIG. 12. As shown on the HMI 400, an operator or user may input values of each of the nine global variables and the two illustrated local feature variables into either the cells of the current values 414 or adjustments 416 of the HMI 400, such as with a keyboard or keypad. In many configurations, the HMI 400 is part of the CNC machine 214, but may also be a computer attached to, and in communication with, the CNC machine 214. The operator may receive the global and local compensation variables based on solutions to the compensation equations occurring within a compensation processor as part of the compensation determination block 314.

Alternatively, the operator may connect a USB data device into the machine and all of the variables may be uploaded into the cells from the USB data device via the direct upload button 420. Alternatively, the direct upload button 420 may represent, or be replaced by, a direct cable link or wireless between the compensation processor and the HMI 400. The direct link would allow either continuous feeding of compensation variables into the current values 414 or adjustments 416, or selective population of the cells of the HMI 400 by the operator, without either plugging in a USB data device or hand-keying the variable values.

In addition to the nine global compensation variables, shown by name and with corresponding variable numbers #800-#808, the HMI 400 illustrates two exemplary local feature variable sets. Two local features—"Local1 mfg hole" and "Local2 dowel AB"—each include three local variables for offsetting the CNC machine 214 during machining of those specific features. The variables #809-#811 are used while machining the first feature, and variables #812-#814 are used while machining the second feature. Entrance of other local variables for other local features may occur only as those variables are needed throughout the programming, or all local variables may be entered to the HMI 400, with only the needed, specific, variables being accessed during machining of the relevant local features. While the example of the HMI 400 shown includes only two local features, numerous additional features may be included in the compensation program.

The HMI 400 illustrates how the values of the variables are prepared for entry into the CNC machine 214 as the parameters of the G-code, without altering the G-code programming. Note that the HMI 400 may be used to alter compensation on either A-on-B or B-on-A CNC machines 214, without alteration or adjustment, as the global compensation variables are the same for either table configuration.

Referring now to Table 1, there is shown an example of Fanuc G-code compensation program to illustrate the use of parameters within the fixed G-code of the 5-axis A-on-B CNC machine 214. The compensation program in Table 1 illustrates use of parameters within the G-code to incorporate the variables determined by the compensation processor, such as in the block 314 of FIG. 12. The variables are communicated for use by the compensation program through an interface, such as the HMI 400 shown in FIG. 13. Although Table 1 illustrates incorporation of the global and local parameters within the Fanuc programming language, the same technique is applicable to other types of controllers, such as Siemens.

TABLE 1

O1016 (OFFSET PRG FOR 5-AXIS MACHINE)
N010 #5=[#3-1]*30  (TYPE RANGE)
N020 IF[#1NE#0] THEN
N030   #3000=1 (A AXIS ANGLE MISSING)
N040 ENDIF
N050 IF[#2NE#0] THEN
N060   #3000=1 (B AXIS ANGLE MISSING)
N070 ENDIF
N080 IF[#4GT0]THEN

TABLE 1-continued

N085   #6=[#4-1]*3   (LOCAL RANGE)
N090 ENDIF
N100 #11= #21 + #[802+#5]
 +[#18 + #24 + #[804+#5]]*COS[#2]
     −[#20+#[801+#5]−[#25 + #[805+#5]]*SIN[#1]
     + [#26 + #[806+#5]]*COS[#1]]*SIN[#2]
N110 #12= #22 + #19 + #[800+#5]
     + [#25 + #[815+#5]]*COS[#1]
     + [#26 + #[816+#5]]*SIN[#1]
N120 #13= #23 + #[803+#5]
 +[#18 +#24 + #[804+#5]]*SIN[#2]
     + [#20+#[801+#5]−[#25 + #[805+#5]]*SIN[#1]
     +[#26 + #[806+#5]]*COS[#1]]*COS[#2]
N130 #14=#[807+#5]
N140 #15=#[808+#5]
N200 IF [#7GT50] THEN
N210   IF[#4GT0]THEN
N220     G10L2P[#7-53] X[#[809+#5+#6]+#11] Y[#[810+#5+#6]+#12]
         Z[#[811+#5+#6]+#13]A[#14]B[#15]
N230   ELSE
N240     G10L2P[#7-53]X[#11]Y[#12]Z[#13] A[#14]B[#15]
N250   ENDIF
N260 ELSE
N270   IF[#4GT0]THEN
N280     G10L20P[#7] X[#[809+#5+#6]+#11] Y[#[810+#5+#6]+#12]
         Z[#[811+#5+#6]+#13] A[#14]B[#15]
N290   ELSE
N300     G10L20P[#7]X[#11]Y[#12]Z[#13] A[#14]B[#15]
N310   ENDIF
N320 EIDIF
N900 M99

Incorporation of the parameters is illustrated through comparison of Equation 15, the HMI 400, and the compensation program in Table 1. For example, note that line N100 of the compensation program tracks the workpiece X-axis position (Wx) from Equation 15. Note that portions of the Fanuc code may be illustrated herein by using the SIN and COS functions as markers within the lines.

The first portion of the line N100 incorporates the variable numbers #802 and #804, which correspond to the Global B Table X offset and the Global Fixture X offset shown in the HMI 400. The parameters 802 and 804 in the G-code allow the global variables $\Delta Tx_B$ and $\Delta Px_0$, the values of which were entered in the corresponding cells of the HMI 400, to be incorporated in the workpiece coordinate definition of the compensation program. The remainder of the line N100 incorporates the rest of the data needed to set Wx.

For the implementation of local variables, when needed for specific features at a fixed table position, the compensation program includes local parameters. For example, line N220 incorporates the local parameters for the first feature, which is the Local1 mfg hole shown in the HMI 400. The local parameters are overlaid onto the global parameters by adding the local parameter for the specific feature only when the specific feature is being machined.

The local parameters shown in the HMI 400 and used by the fixed G-code illustrated in Table 1 are variables #809-#814. These variables account for two sets of offsets for first and second features ("Local1 mfg hole" and "Local2 dowel AB," respectively). The sets include an x-direction, y-direction, and z-direction movement for each local feature offset to be used while manufacturing those local features.

Note that additional local features, and their respective sets of x, y, and z movements may also be included in the compensation program. For instance, another screen of the HMI 400 may have similar structure, but will allow input of offsets for a third feature (Local3), a fourth feature (Local4), and the like.

Again, note that the global and local compensation variables are input into the fixed G-code compensation program as global and local parameters accessed via registers. The compensation program, itself, is not altered.

The global and local parameters may be the same between different machine lines using different, but similar, CNC machines 214 to create the part 12. However, the values input into the global and local variables through the HMI 400 may be different because each of the different CNC machines 214 may have different errors. If this were not the case, offsetting each of the CNC machines 214 would require that each machine have different, specifically-tailored compensation programs installed thereupon.

The HMI 400 and Table 1 also illustrate a macro structure for programming of the CNC machine 214 that facilitates access to the compensation program via registers, for multiple parts 12 or for multiple variations of the part 12. For example, the HMI 400 illustrates a specific variation called "Part3803-Var6," but additional variations of the part 12 may be accessed by the same macro structure of the compensation program. For example, "Part3803-Var6," may be a 6-cylinder version of the part 12, and another screen of the HMI may allow entrance of offsets for "Part3803-Var8," which may be an 8-cyclinder version of the same part 12.

Table 1 illustrates call-up or selection of specific compensation programs for specific variations of the parts 12. The line N010 is specified to provide the compensation program with a "TYPE RANGE" that identifies the specific part 12 for which the compensation program is shifting position of the CNC Machine 214. Therefore, the line N010 tells the compensation program to access the screen or data bank of the HMI 400 for the "Part3803-Var6," program.

In automated processes, the type range (which may also be referred to as a group range or global range) may be identified by markers (such as QR or bar codes) on incoming workpieces. For example, an incoming workpiece may by marked to alert the CNC machine 214 that the workpiece is slated for the "Part3803-Var8," type range. The CNC machine 214 then inputs that type range into line N010 and pulls the global compensation variables from the HMI 400 for that specific variation of the part 12.

This allows the same, fixed, compensation program to pull up specific compensation offsets—and to physically shift the CNC machine 214 based thereupon—for a multitude of different parts 12 or variations of part 12. Lines N100-N140 of Table 1 show the compensation program pulling the global compensation variables from the HMI 400. The global compensation variables or parameters will be used to shift the position of the CNC machine 214 for all feature programs executed to create "Part3803-Var6."

Furthermore, the compensation program illustrated in Table 1 and the HMI 400 interfacing therewith is configured to call-up or select the different sets of local offsets, when needed. As shown in, for example, line N220, the compensation program is pulling a first set of local compensation variables (#809, #810, and #811, representing x, y, and z direction shifts) from the HMI 400. As the CNC machine 214 progresses to machining other local features that require local offsets—noting that not all features do require local offsets, and many are sufficiently offset by the global compensation—the compensation program can access the other sets of local compensation variables. Different variations of part 12 may utilize the same global or local offsets, which may decrease processing or data storage the load on the HMI 400.

As described herein, the fixed compensation program (Table 1 being one example thereof) acts as the macro programming structure for the CNC machine 214, substantially regardless of the part 12 that is being produced by the CNC machine 214. However, registers built into the compensation program allow offsetting for different parts 12 through the interface (HMI 400 being one example thereof). Therefore, a single CNC machine 214 having a single compensation program, is able to communicate with a single interface through registers in the single compensation program in order to offset the CNC machine 214 for a multitude of different parts 12 or variations of parts 12, without substantial down time or reprogramming time.

While the best modes for carrying out the disclosed methods, processes, and structures have been described in detail, those familiar with the art to which the disclosed methods, processes, and structures relate will recognize various alternative designs and embodiments for practicing the disclosure within the scope of the appended claims. All directional references (e.g., upper, lower, upward, downward, left, right, leftward, rightward, above, below, vertical, and horizontal) are only used for identification purposes to aid the reader's understanding of the present disclosure, and do not create limitations, particularly as to the position, orientation, or use of the disclosed methods, processes, and structures. It is intended that all matter contained in the above description or shown in the accompanying drawings shall be interpreted as illustrative only and not as limiting.

The invention claimed is:

1. A system for offsetting a computer numerical controlled (CNC) manufacturing process, comprising:
 a computer numerical controlled (CNC) machine having a fixed compensation program configured to provide a first workpiece coordinate definition; and
 an interface configured to receive a plurality of compensation variables and communicate the compensation variables to the CNC machine,
 wherein the fixed compensation program of the CNC machine is configured to enter the compensation variables from the interface as compensation parameters,
 wherein the fixed compensation program is configured to adjust the first workpiece coordinate definition to a second workpiece coordinate definition based on the compensation parameters, and
 wherein the CNC machine is configured to physically alter a position of a workpiece in the CNC machine based on the second workpiece coordinate definition.

2. The system of claim 1, wherein the compensation variables are transferred from the interface to the CNC machine via registers built into the fixed compensation program of the CNC machine.

3. The system of claim 2,
 wherein the CNC machine is configured to execute a plurality of feature programs, and
 wherein the compensation variables supplied to the CNC machine include global compensation variables applied to all of the feature programs, and local compensation variables applied only to subsets of the feature programs.

4. The system of claim 3, wherein the local compensation variables are added to the second workpiece coordinate definition only when the subsets of the feature programs are being implemented, such that the second workpiece coordinate definition varies based on application of local compensation variables.

5. The system of claim 4, further comprising:
 a coordinate measurement machine (CMM) configured to measure machined workpieces and output error data; and a compensation processor configured to determine the compensation variables from the error data and to transfer the compensation variables to the interface.

6. The system of claim 1,
wherein the CNC machine is configured to execute a plurality of feature programs, and
wherein the compensation variables supplied to the CNC machine include global compensation variables applied to all of the feature programs, and local compensation variables applied only to subsets of the feature programs.

7. The system of claim 2, wherein the local compensation variables are added to the second workpiece coordinate definition only when the subsets of the feature programs are being implemented, such that the second workpiece coordinate definition varies based on application of local compensation variables.

8. A method for offsetting a computer controlled machine, comprising:
sending compensation variables to an interface, wherein the compensation variables include global variables and local variables;
inputting the compensation variables through the interface into the computer controlled machine, wherein the compensation variables are input through registers of a fixed compensation program;
executing the fixed compensation program to physically offset the computer controlled machine based on the global variables and the local variables; and
executing a plurality of feature programs, wherein the global variables offset all of the feature programs and the local variables offset only a subset of the feature programs.

9. The method of claim 8, wherein executing the fixed compensation program to physically offset the computer controlled machine includes:
translating the computer controlled machine in linear directions and at least one rotational direction in response to global variables; and
translating the computer controlled machine in only linear directions, with fixed rotational directions, in response to local variables.

10. A method for offsetting a computer controlled machine producing a plurality of part variations, comprising:
storing compensation variables for a first part variation and a second part variation in an interface, wherein the interface is in communication with a fixed compensation program executable by the computer controlled machine;
executing a first plurality of feature programs for the first part variation, including:
inputting a first type range for the first part variation into the fixed compensation program;
sending a first global variable set from the interface to the fixed compensation program in response to the first type range;
shifting a physical position of the CNC machine based on the first global variable set for all of the first plurality of feature programs;
sending a first local variable set from the interface to the fixed compensation program;
shifting a physical position of the CNC machine based on the first local variable set for a first subset of the first plurality of feature programs;
sending a second local variable set from the interface to the fixed compensation program; and
shifting a physical position of the CNC machine based on the second local variable set for a second subset of the first plurality of feature programs; and
executing a second plurality of feature programs for the second part variation, including:
inputting a second type range for the second part variation into the fixed compensation program;
sending a second global variable set from the interface to the fixed compensation program in response to the second type range;
shifting a physical position of the CNC machine based on the second global variable set for all of the second plurality of feature programs;
sending a third local variable set from the interface to the fixed compensation program;
shifting a physical position of the CNC machine based on the third local variable set for a first subset of the second plurality of feature programs;
sending a fourth local variable set from the interface to the fixed compensation program; and
shifting a physical position of the CNC machine based on the fourth local variable set for a second subset of the second plurality of feature programs.

11. The method of claim 10,
wherein the first global variable set and the second global variable set include shifts in at least an x-direction, a y-direction, a z-direction, a first axis rotation, and a second axis rotation; and
wherein the first local variable set, the second local variable set, the third local variable set, and the fourth local variable set include shifts in the x-direction, the y-direction, and the z-direction, but not shifts of the first axis rotation and the second axis rotation.

* * * * *